(12) United States Patent
O'Brien et al.

(10) Patent No.: US 6,360,442 B2
(45) Date of Patent: *Mar. 26, 2002

(54) GRAPEFRUIT KNIFE

(75) Inventors: Thomas O'Brien, Lititz, PA (US); Michael Neshat; Chuck Visocky, both of Walnut Ridge, AK (US)

(73) Assignee: The Pampered Chef, Ltd., Addison, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,583

(22) Filed: Aug. 31, 1998

(51) Int. Cl.[7] ................................................ B26B 3/00
(52) U.S. Cl. ........................ 30/123.5; 30/123.7; 30/299; 30/144; 30/279.6; 30/149
(58) Field of Search ........................ 30/304, 299, 355, 30/279.6, 123.7, 324, 325, 326, 327, 328, 148, 322, 323, 147, 149, 150, 123.5, 114; D7/667

(56) References Cited

U.S. PATENT DOCUMENTS

| | | | |
|---|---|---|---|
| 717,998 A | * 1/1903 | Huebner | 30/142 |
| 966,496 A | * 8/1910 | Wagner | 30/279.6 |
| 1,041,767 A | 10/1912 | Frank | |
| 1,044,869 A | * 11/1912 | Emmenegger | 30/147 |
| D48,692 S | 3/1916 | Mouser | |
| 1,261,954 A | 4/1918 | Newman | |
| 1,326,373 A | 12/1919 | Rice | |
| 1,479,015 A | 1/1924 | Steinman | |
| 1,482,736 A | * 2/1924 | Catsules | 30/355 |
| 1,527,561 A | * 2/1925 | Klum | 30/355 |
| 1,638,956 A | 8/1927 | Pinchbeck et al. | |
| 2,258,448 A | * 10/1941 | Gesell | 30/304 |
| 2,309,177 A | * 1/1943 | Eifler | 30/123.7 |
| 2,320,994 A | * 6/1943 | Wright | 30/324 |
| D136,343 S | * 9/1943 | Gamache | D7/667 |
| 2,473,288 A | * 6/1949 | McNeill | 30/147 |
| 2,505,917 A | 5/1950 | Schumacher | 30/24 |
| 2,528,071 A | 10/1950 | Morishita et al. | 30/24 |
| 2,528,166 A | 10/1950 | Orr et al. | 30/24 |
| 2,647,310 A | * 8/1953 | Yolles | 30/355 |
| 2,692,428 A | * 8/1954 | Morishita | 30/299 |
| 3,086,286 A | 4/1963 | Faller | 30/24 |
| D213,486 S | 3/1969 | Clarke | D89/1 |
| 4,010,541 A | 3/1977 | Papineau | 30/123.7 |
| 4,255,854 A | * 3/1981 | Bilbao | 30/299 |
| D262,934 S | 2/1982 | Gross | D7/147 |
| 5,529,534 A | * 6/1996 | Adams | 30/123.7 |
| 5,542,181 A | * 8/1996 | Gaylord | 30/148 |
| 5,845,403 A | * 12/1998 | Nivin | 30/147 |

OTHER PUBLICATIONS

Squirtless Grapefruit Knife, Norpro Product Catalog, p. 9, Norpro (Apr. 1992).

Grapefruit Knife, Fox Run Craftsman Catalog, p. 1, Fox Run (1993).

* cited by examiner

*Primary Examiner*—Boyer Ashley
*Assistant Examiner*—Omar Flores-Sánchez
(74) *Attorney, Agent, or Firm*—Olson & Hierl, Ltd.

(57) ABSTRACT

A grapefruit knife for use in cutting sections of edible fruit from the less desirable membrane and peel is disclosed. The present invention includes a handle having two opposing ends, a single cutting blade attached to one end of the handle, and a scooping blade attached to the other end of the handle. Each of these blades has two cutting edges. On the cutting blade the two cutting edges are aligned serially, in a plane, to cut in the same direction, while on the scooping blade the cutting edges are opposingly arranged.

3 Claims, 2 Drawing Sheets

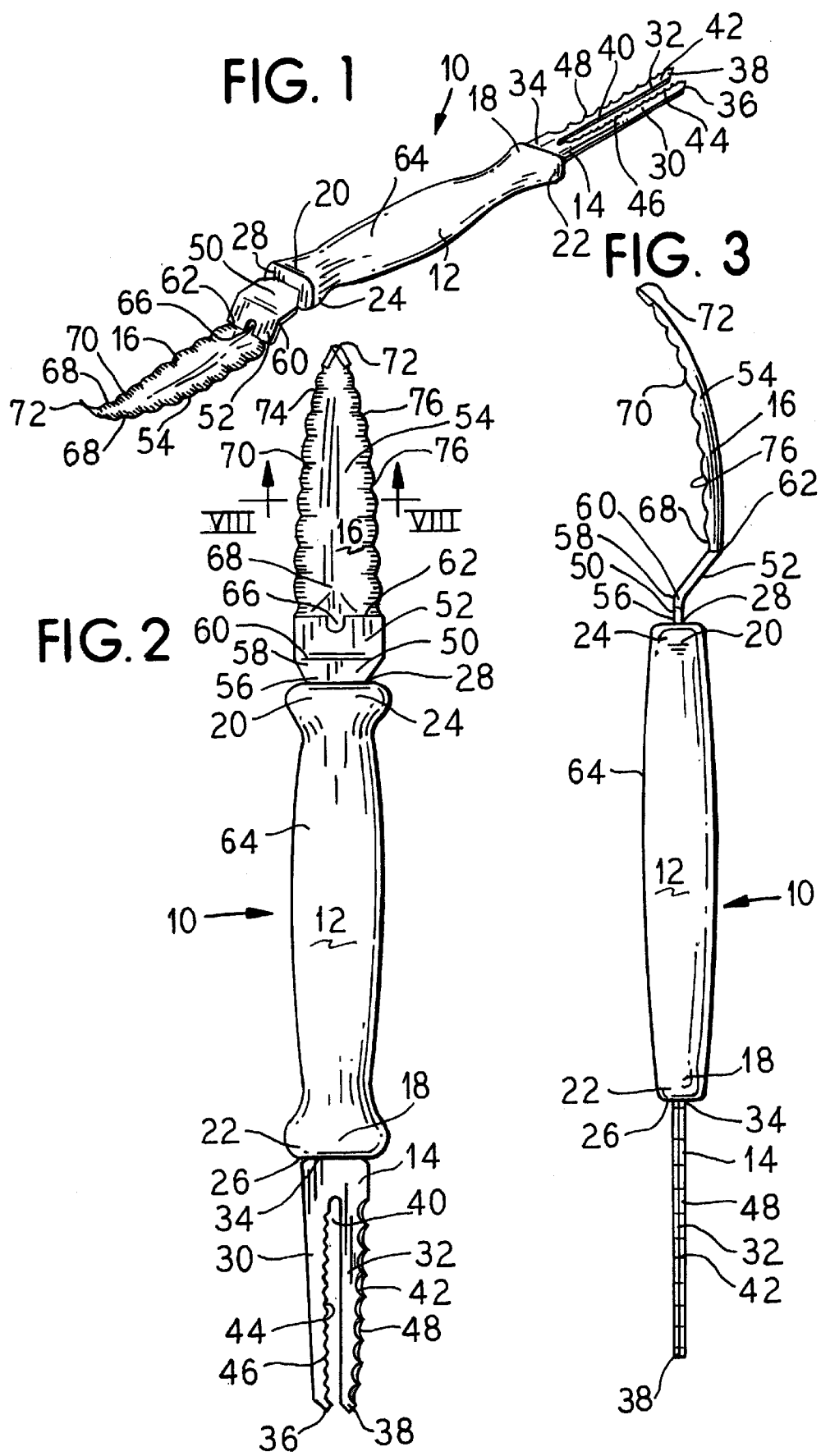

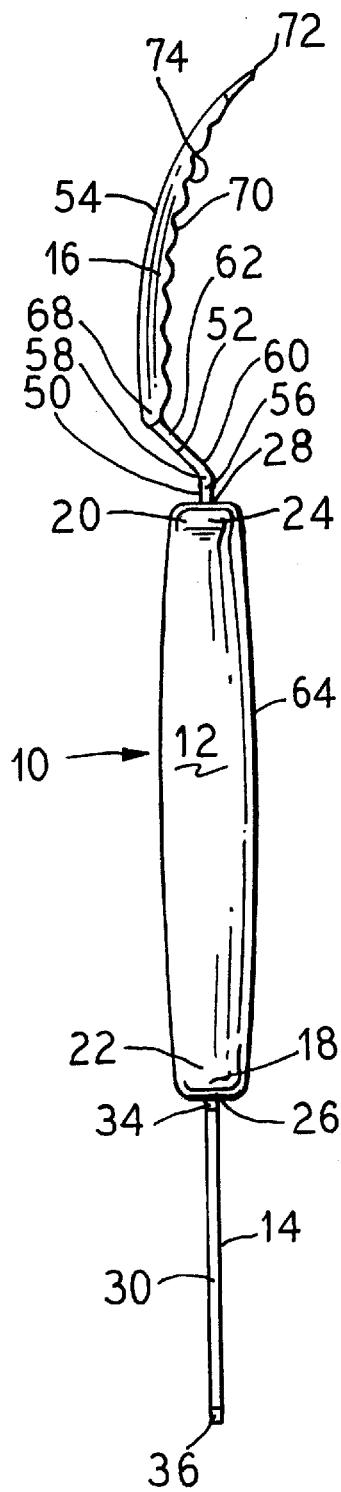
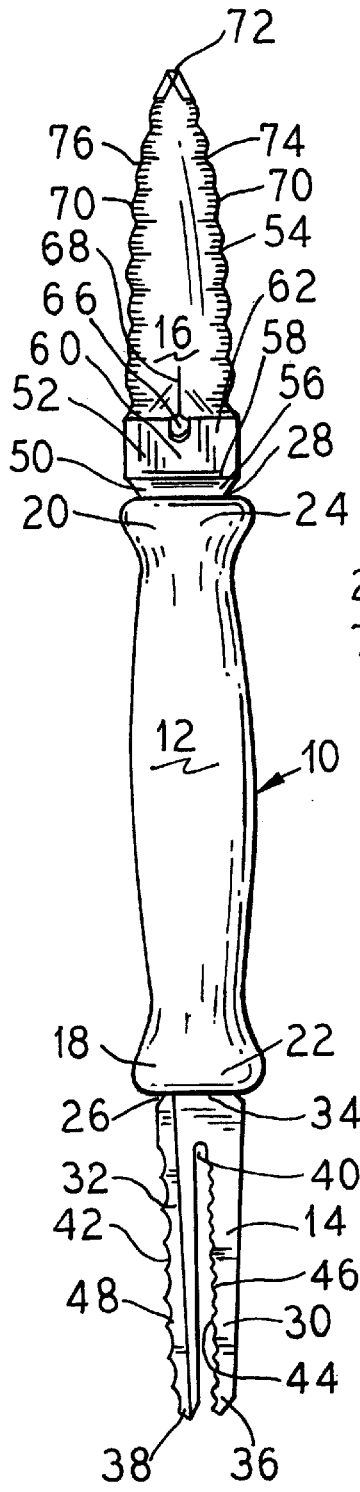
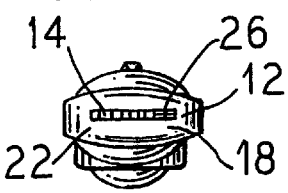
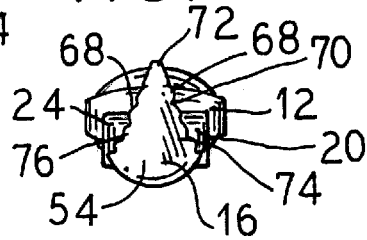
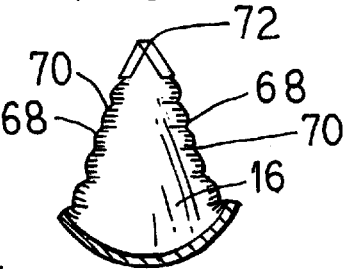

GRAPEFRUIT KNIFE

FIELD OF THE INVENTION

The present invention relates generally to a cutlery tool for removing edible sections or wedges from a fruit. More particularly, the invention relates to a grapefruit knife.

BACKGROUND OF THE INVENTION

Eating a halved piece of fruit, such as grapefruit or other citrus fruit, can often be a messy undertaking. Furthermore, the taste may be tainted by some by the fibrous membrane that surrounds and connects each citrus section together. These problems, and others, have been solved by the present invention.

Prior to the present invention, numerous grapefruit knives have existed. Representations of other efforts can be seen in U.S. Pat. Nos. 4,255,854 to Bilbao, and U.S. Pat. No. Des. 262,934 to Gross. While the Bilbao patent does show a multiple cutting edged blade, the serrated edges of the two cutting edges are perpendicular to the serrated edges of two other cutting edges on the same blade. This arrangement makes cutting through the tough membrane difficult without damaging the desired fruit sections. Removing the cut-away fruit sections from the fruit would also be hindered by the towering blade portion shown in FIG. 1 of the Bilbao patent.

The Gross patent discloses a multi-bladed grapefruit knife. One blade is shown to be curved and serrated along a single edge. Opposite the first blade, a second and third blade are shown arranged adjacent to one another, with each blade serrated along a single edge. While this arrangement may allow for cutting the membrane, the single curved blade serrated along one edge does not provide for easy removal of the cut sections of fruit.

The present invention discloses a double-bladed grapefruit knife that is both functionally practical and aesthetically pleasing. The present knife is capable of making meticulous cuts along the various fruit membranes to free up the edible sections. Additionally, the present knife is capable of removing the freed sections in a simple, non-messy manner.

SUMMARY OF THE INVENTION

This invention provides a new and useful grapefruit knife for use in cutting sections of edible fruit from the less desirable membrane and peel.

In a preferred embodiment, the present invention is comprised of a handle having two opposing ends, a scooping blade attached to one end of the handle, and a single, cutting blade attached to the other end of the handle. Each of these blades has two cutting edges. On the scooping blade the two cutting edges are arranged on opposite tapering edges, while on the cutting blade, which preferably branches into two parts, the cutting edge of each part is serially aligned to cut in the same direction.

It is an object of the present invention to permit simultaneous cutting on each side of a membrane. The flexibility of the cutting blade allows the two cutting edges to be offset laterally. The thin membrane is easily fitted within this offset, and cutting can then occur on both sides of the membrane.

Another object of the present invention is to allow individual sections of citrus fruit to be removed, without mess, from the remaining sections. As a means for accomplishing this object, the serrated scooping blade is preferably curved.

Other and further objects, aims, features, advantages, embodiments, alternatives and the like will be apparent to those skilled in the art from the present specification, accompanying drawings and appended claims.

BRIEF DESCRIPTION OF THE DRAWINGS

In the drawings:

FIG. 1 is a perspective view of one embodiment of the present invention;

FIG. 2 is a top plan view (relative to FIG. 1) of the embodiment shown in FIG. 1;

FIG. 3 is a right side elevational view (relative to FIG. 2) of the embodiment of FIG. 1;

FIG. 4 is a left side elevational view (relative to FIG. 2) of the embodiment of FIG. 1;

FIG. 5 is a bottom plan view (relative to FIG. 2) of the embodiment shown in FIG. 1;

FIG. 6 is a back end view (relative to FIG. 2) of the embodiment shown in FIG. 1;

FIG. 7 is a front end view (relative to FIG. 2) of the embodiment shown in FIG. 1; and FIG. 8 is a cross-sectional view of the scooping blade through the curved portion taken substantially along line VIII—VIII of FIG. 2.

DETAILED DESCRIPTION

Referring to FIGS. 1–8, there is shown one embodiment of the present invention, a knife generally designated 10. Knife 10 is well suited for cutting edible sections from the membrane and peel portion of most citrus fruit, such as grapefruit, oranges or the like.

Referring to FIG. 1, a perspective view of the present invention, knife 10, is shown comprised generally of handle 12, cutting blade 14, and scooping blade 16. Each of these components has further aesthetic and functional features which permit it to accomplish its goals and objects.

In the preferred embodiment, handle 12 is constructed of a durable material, such as a hard wood, metal, or hard plastic. As shown in FIGS. 2–5, handle 12 has first and second opposing ends 18 and 20 to which blades 14 and 16, respectively are attached. Handle 12 is elongated and preferably symmetrical about several axes, as can be seen from the various views. The symmetry is preferred to enable knife 10 to be used by right-handed as well as left-handed individuals. Opposing first and second transversely enlarged regions, 22 and 24, are located at first and second opposing ends 18 and 20 respectively. This feature, in the present embodiment, is used to prevent the individual's hand from slipping down the handle 12 and across either blades 14 or 16.

It is preferred that blades 14 and 16 are comprised of any material typically used in cutlery devices including, but not limited to, stainless steel, aluminum, aluminum alloys, steel alloys or other metals or alloys. Moreover, it is not necessary that cutting blade 14 be comprised of the same material as scooping blade 16.

Additionally, first and second cavities 26 and 28 are defined by handle 12 and located at first and second opposing ends 18 and 20, respectively. First and second cavities 26 and 28 are defined so that cutting blade 14 and scooping blade 16, respectively, may be inserted therein and thereby frictionally retained. Cutting and scooping blades 14 and 16 may be affixed in the first and second cavities 26 and 28 in any suitable manner known to those skilled in the relevant art. In a preferred embodiment, cutting and scooping blades 14 and 16 are attached to handle 12 by either machine screws, rivets, or the like (not shown).

A second component of knife 10 is cutting blade 14. As best seen in FIGS. 2 and 5, cutting blade 14 is a single blade comprised of first and second serrated cutting edges 30 and 32, having first end region 34 that is inserted into first cavity 26 and affixed therein. This feature is distinct from prior art double bladed knives. The first and second double blades of the prior art require two attachments and are therefore mounted side-by-side in the handle with a small slated gap therebetween. The first and second serrated cutting edges 30 and 32 of the present invention are aligned serially in a single plane, one transversely behind the other, as best illustrated in FIGS. 3, 4 and 6, so that the first and second serrated cutting edges 30 and 32 cut in the same direction.

Preferably, cutting blade 14 is slightly flexible to allow the first and second serrated edges 30 and 32 to be urged side-to-side by the user. A small gap 40 is defined between the first and second serrated cutting edges 32 and 34 for positioning over the fruit membrane (see "Use" below).

In the present embodiment, second cutting edge 32 is serrated along substantially the entire length of an outside edge 42, (see FIGS. 2 and 3) that is facing away from gap 40 as depicted. Likewise, first cutting edge 32 is serrated along substantially the entire length of an inside edge 44, that is facing towards the gap 40. The serrating of first and second serrated cutting edges 30 and 32 may be similar, but preferably, and as shown first notches 46 of the first serrated cutting edge 30 differ in size and number from the second notches 48 of the second serrated cutting edge 32, providing diverse cutting edges.

For example, the second serrated cutting edge 32 may have a serrated design with large, (and fewer) second notches 48 per unit of length when compared to the first notches 46 of the first serrated cutting edge 30. The "larger" second notches 48 are suitable for cutting through the outer peel (or skin) of a grapefruit, as well as cutting through fruit sections. Comparatively, the first serrated cutting edge 30 may have smaller (and more) first notches 46 per unit of length when compared to the second notches 48. The "smaller" first notches 46 are more suited for making a finer cut, preferably designed for cutting through the fruit sections (or segments) or cutting along the membranes occurring between adjacent fruit sections, as desired.

It is also anticipated for alternative embodiments (not shown) that the length of second serrated cutting edge 32 may be slightly longer than the length of the first serrated cutting edge 30. The purpose of this feature is to allow the two cutting edges 30 and 32 relative to be more easily separated to opposite sides of a fruit membrane as cutting blade 14 is inserted therein.

A third component of knife 10, as shown in FIGS. 2–5, 7 and 8, is the scooping blade 16. In the depicted embodiment scooping blade 16 is formed of three segments: neck portion 50, angled portion 52, and transversely and longitudinally curved portion 54.

Neck portion 50 has opposing first and second neck ends 56 and 58. First neck end 56 is inserted into the second cavity 28 and affixed therein as provided above. Additionally, angled portion 52 of scooping blade 16, having opposing first and second angled ends 60 and 62, is connected to second neck end 58 of neck portion 50, so that second neck end 58 is connected to and is joined with the first angled end 60. Preferably as scooping blade 16 including neck portion 50 and angled portion 52, is formed as a single, integral unit.

In FIGS. 2–5, and specifically FIGS. 3 and 4, it can be seen that first and second angled ends 60 and 62 of angled portion 62 are formed having opposing predetermined angles. First angled end 60 is formed so that the angled portion 52 extends away from a plan or region defined by top surface portion 64 of handle 12 at a predetermined angle. Second angled end 62 is formed opposite the angle of first angled end 60, so that angled portion 52 and thus curved portion 54, extends back towards the plane defined by top surface 64 at a predetermined angle.

Additionally a small opening 66 is formed in the second angled end 62. Small opening 66 acts as a drain, providing a convenient avenue for juice to pass through the scooping blade 16 that might otherwise accumulate in curved portion 54. It should be noted that while only one small opening 66 is depicted and discussed, more are contemplated. While the small opening 66 is preferably formed in the second angled end 62, it is contemplated that one or more small openings 66 could be formed elsewhere on scooping blade 16, on curved portion 54 for example.

The drawings illustrate that curved portion 54 is joined to angled portion 52, where a first end 68 of curved portion 54 is connected to second angled end 62. It is further revealed that curved portion 54 tapers along outside edges 70 toward the end of scooping blade 16 until it comes to pointed tip 72 opposite the first end 68 (FIGS. 2–5 and 7–8). Pointed tip 72 is used to penetrate into the wedge sections of the fruit. It should be noted that, in the depicted preferred embodiment, the curved portion 54 gently curves upward, from the first end 68 towards the pointed tip 72. In the depicted preferred embodiment, pointed tip 72 just touches the plane defined by the top surface 64.

From a review of the drawings, it is apparent that the two opposed outside edges 70 of the scooping blade 16 are serrated, having third and fourth notches 74 and 76. In the depicted embodiment, third and fourth notches 74 and 76 are equal in size and number. However, an embodiment is contemplated where third notches 74 may differ in size and/or number when compared to the fourth notches 76. Alternatively, only one of the outside edges 70 may be serrated, or both outside edges may be razored, beveled, or a combination thereof.

As those skilled in the art will appreciate from the foregoing description and the preferred embodiment shown in the accompanying drawings, the elongation and the longitudinal and transverse curvature of the scooping blade 16 is conveniently configured to resemble approximately the length and curvature of a commonly occurring (or typical) outer circumferential portion of a citrus fruit half section, such as a grapefruit half section, taken from a region beginning approximately at a citrus fruit half wherein such section occurs and proceeding along said portion towards the end of said section.

Having described the basic structure of a preferred embodiment of the present invention, an understanding of the various changes which may be made and still be considered to be considered to fall within the intended scope and spirit of the invention is facilitated by a discussion of how knife 10 may be used. The following is merely descriptive of one such possible use.

Use of Grapefruit Knife

Referring to FIGS. 1–8, one embodiment of knife 10 which may be used for cutting wedges from a halved citrus fruit (not shown) can be seen. Knife 10 is most effective when used on halved fruit, cut through the middle, i.e., across the wedges, as opposed to fruit which is cut from top to bottom with the wedges. Cutting blade 14 may be inserted at the center of the face of the halved fruit with first and second serrated cutting edges 30 and 32 directed toward the edge of the fruit. Upon insertion, the gap 40 may be guided to allow the fruit membrane to enter completely therein, so that it extends between the first and second serrated cutting edges 30 and 32.

From this position, knife 10 is rotated to bring first and second serrated cutting edges 30 and 32 parallel with the membrane wall and facing outward. Knife 10 is urged toward the fruit's extremity using a reciprocating motion until reaching the peel or outer membrane of the fruit. The insertion and cutting steps may be repeated with each of the remaining wedge membranes.

Scooping blade 16 is then employed to remove each wedge. The scooping blade 16 is inserted, pointed tip 72 first, near the extremity of the fruit wedge, i.e., near the peel. Insertion should be made at the interior side of the peel and adjacent membrane. The contour of the curved portion 54 of scooping blade 16 should follow the curve of the fruit until the pointed tip 72 reaches the center. The tapering outside edges 70 will cut through the underside of the fruit section without requiring a reciprocating motion. Any juice resulting from cutting the underside of the section of fruit will pass through small opening 66 rather than collecting in the curved portion 54. At this point the wedge may be lifted from the fruit. Again, this may be repeated for each of the remaining fruit wedge sections.

By virtue of the present invention, the described objects are met. The knife 10, using the curved portion 54 of scooping blade 16 in combination with the small opening 66, allows individual sections of fruit to be removed without mess. Furthermore, using the first and second serrated cutting edges 30 and 32, in combination with the gap 40, allows cutting to occur on both sides of the membrane simultaneously. This reduces the amount of time required for cutting and preparing citrus fruit.

The foregoing illustrates the general principles of this invention. However, since numerous modifications and changes will be readily apparent to those skilled in the art based on this description, it is not desired to limit the invention to the exact construction and operation shown and described. Accordingly, the scope of this invention includes other modifications and equivalents that fall within the scope of the description and the following claims.

What is claimed is:

1. A knife for preparing citrus fruit comprising:

an elongated, hand-graspable handle member having opposite end regions, said handle member being transversely thickened in a portion of each of said opposite end regions;

first and second blade members, each one connected to a different one of said opposite end regions and extending outwardly in generally opposed relationship to each other;

said first blade member having a first stem portion adjacent to said handle member and having a flattened elongated first blade portion projecting from and connected to said first stem portion;

said first blade portion being longitudinally bifurcated so as to define first and second elongated blade sections that are in adjacent, transversely spaced, parallel relationship relative to each other with a slotted gap therebetween;

said first blade section having a first cutting surface extending along an outside edge portion thereof;

said second section having a second cutting surface extending along an inside edge portion thereof;

said second cutting surface being generally in adjacent spaced parallel relationship to said first cutting surface so that said first and said second cutting surfaces cut in the same direction;

said second blade member having a second stem portion adjacent to said handle member and having an elongated, longitudinally and transversely curved second blade portion projecting from and connected to said second stem portion;

said second blade portion having:

a transversely broadened base region adjacent said second stem portion whose width approximates the width of a citrus fruit segment;

an outermost terminal pointed region; and opposed side edges that symmetrically taper from said base region to meet at said pointed region;

said opposite side edges each having a cutting surface extending therealong;

said second stem portion having a configuration such that said base region is offset from said handle member;

said second blade portion having defined therein a first angle adjacent to said second stem portion and relative to said handle member and a second angle adjacent to said base region that inclines said second stem portion relative to said curved second blade portion; and said second blade member having a relatively small aperture means defined therethrough in the region where said second stem portion and said second blade portion so connect.

2. The knife of claim 1 wherein, in said second blade portion, said point region extends to a plane defined by a side surface of said handle member.

3. The knife of claim 1 where, in said second blade portion, said point region extends to a hypothetical plane defined by a side surface of said handle member.

* * * * *

UNITED STATES PATENT AND TRADEMARK OFFICE
CERTIFICATE OF CORRECTION

PATENT NO. : 6,360,442 B2
DATED : March 26, 2002
INVENTOR(S) : Thomas O'Brien et al.

It is certified that error appears in the above-identified patent and that said Letters Patent is hereby corrected as shown below:

<u>Column 3,</u>
Line 8, change "slated" to -- slotted --.
Line 16, insert -- slotted -- after "small".
Line 21, change "3" to -- 5 --.
Line 31, change "large" to -- larger --.
Line 63, delete "as" after -- Preferably --.

<u>Column 4,</u>
Line 3, change "plan" to -- planar --.

Signed and Sealed this

Twelfth Day of November, 2002

Attest:

JAMES E. ROGAN
Attesting Officer
Director of the United States Patent and Trademark Office